US008429013B2

(12) United States Patent
Symons et al.

(10) Patent No.: US 8,429,013 B2
(45) Date of Patent: Apr. 23, 2013

(54) DYNAMIC GEO-LOCATION PARAMETER FOR DETERMINING AN IMPACT OF ONLINE BEHAVIOR ON OFFLINE SALES

(75) Inventors: Matthew Symons, Oakland, CA (US); Miles Fender, Sonoma, CA (US); Piu Bose, Oakland, CA (US)

(73) Assignee: Accenture Global Services Limited, Dublin (IE)

( * ) Notice: Subject to any disclaimer, the term of this patent is extended or adjusted under 35 U.S.C. 154(b) by 476 days.

(21) Appl. No.: 12/366,118

(22) Filed: Feb. 5, 2009

(65) Prior Publication Data
US 2010/0094682 A1 Apr. 15, 2010

Related U.S. Application Data

(60) Provisional application No. 61/105,674, filed on Oct. 15, 2008.

(51) Int. Cl.
G06Q 30/00 (2012.01)
(52) U.S. Cl.
USPC ............... 705/14.49; 705/14.41; 705/14.57
(58) Field of Classification Search ............... None
See application file for complete search history.

(56) References Cited

U.S. PATENT DOCUMENTS

| | | | |
|---|---|---|---|
| 6,665,715 B1 | 12/2003 | Houri | |
| 7,680,796 B2 * | 3/2010 | Yeh et al. | 707/724 |
| 2002/0004754 A1 * | 1/2002 | Gardenswartz et al. | 705/26 |
| 2002/0023000 A1 | 2/2002 | Bollay | |
| 2003/0065571 A1 | 4/2003 | Dutta | |
| 2003/0202009 A1 | 10/2003 | Kasriel | |
| 2004/0138943 A1 | 7/2004 | Silvernail | |
| 2004/0215517 A1 | 10/2004 | Chen et al. | |
| 2006/0011716 A1 | 1/2006 | Perkowski | |
| 2007/0100690 A1 | 5/2007 | Hopkins | |
| 2007/0198355 A1 | 8/2007 | Samson et al. | |
| 2008/0004884 A1 * | 1/2008 | Flake et al. | 705/1 |
| 2008/0005313 A1 | 1/2008 | Flake et al. | |
| 2008/0133342 A1 * | 6/2008 | Criou et al. | 705/14 |
| 2009/0240558 A1 * | 9/2009 | Bandy et al. | 705/10 |

FOREIGN PATENT DOCUMENTS

KR 20020063008 A 8/2002

OTHER PUBLICATIONS

"European search report", European Patent Office, European Application No. 09012210.2, Dec. 18, 2009.

* cited by examiner

Primary Examiner — Fahd Obeid
(74) Attorney, Agent, or Firm — Mannava & Kang, P.C.

(57) ABSTRACT

Online behavior of users related to a product is captured. Also, offline sales for the product is also captured. Geo-location parameters are also determined for the captured online and offline data. Using the geo-location parameters and captured data for the product, a smallest geo-location parameter of statistical significance for estimating an impact of the online behavior on offline sales is determined.

18 Claims, 5 Drawing Sheets

DYNAMIC GEO-LOCATION PARAMETER FOR DETERMINING AN IMPACT OF ONLINE BEHAVIOR ON OFFLINE SALES

PRIORITY

This application claims priority to U.S. provisional patent application Ser. No. 61/105,674, filed Oct. 15, 2008, and entitled "Dynamic Regioning for Online and Offline Cross Optimization Parameter", which is incorporated by reference in its entirety.

BACKGROUND

In today's digital age, companies selling goods and services to consumers must engage in online marketing and sales over the Internet to be competitive. For example, many large department stores that traditionally have brick and mortar stores also have sophisticated web sites providing detailed product information and the ability for visitors to purchase products online. Furthermore, many companies have large marketing budgets directed to online marketing, including marketing on their web sites.

One of the key challenges facing these companies is how to evaluate their online marketing efforts. Online activity, such as web site traffic and online sales may be used as a measure of online marketing efforts. However, online marketing may impact in-store sales as well as online sales. For example, a consumer may view product information online and then go to the brick and mortar store to see the product and ultimately purchase the product at the store. It is very difficult to track the impact of online marketing when purchases are made in this manner. To optimize marketing efforts and justify spending for online marketing, companies need to have the ability to accurately capture the impact of their online marketing efforts on offline sales.

BRIEF DESCRIPTION OF DRAWINGS

The embodiments of the invention will be described in detail in the following description with reference to the following figures.

DETAILED DESCRIPTION OF EMBODIMENTS

Figure 1:
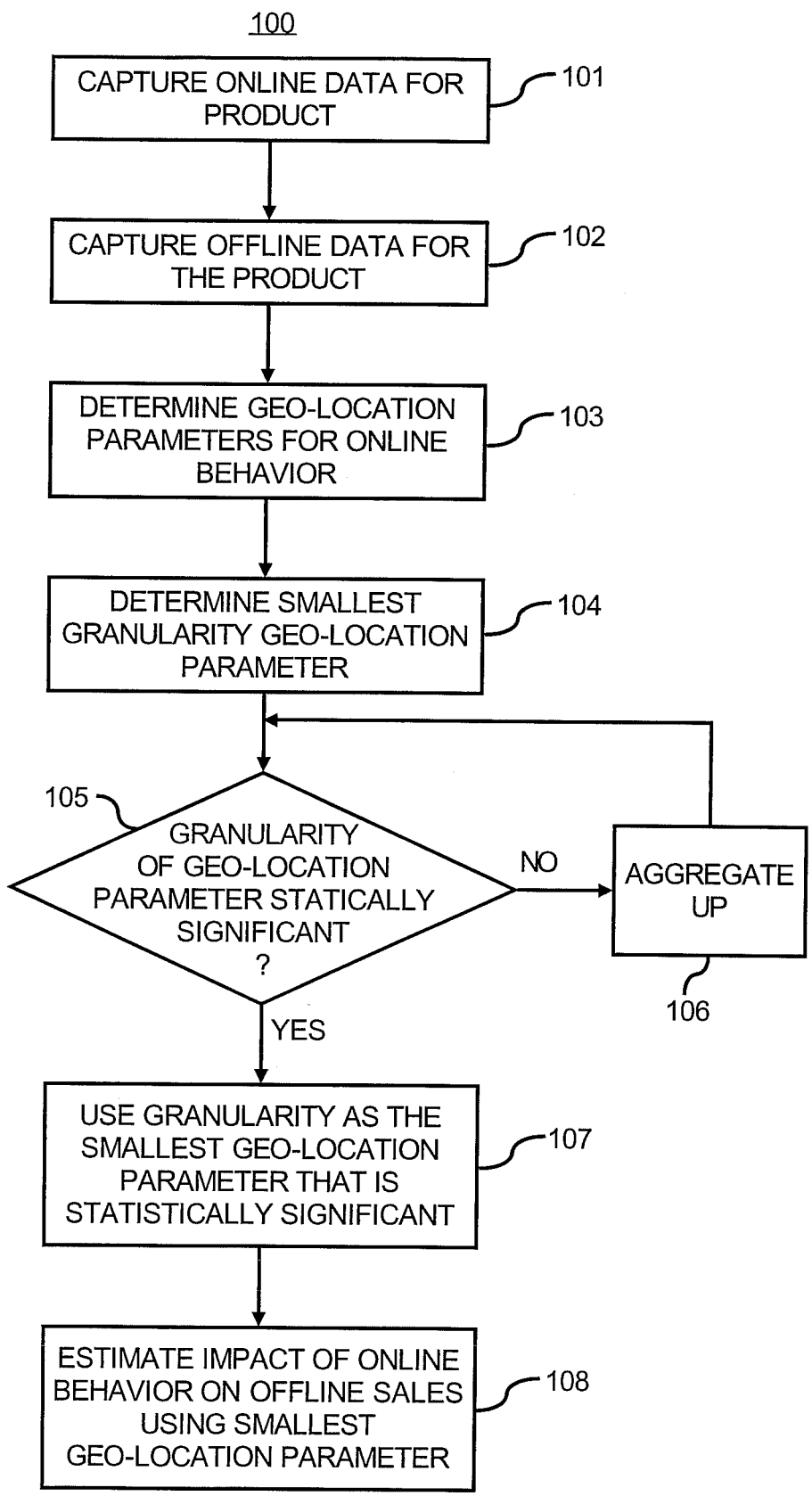
FIG. 1 illustrates a method for determining a smallest geo-location parameter, according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

1. Overview

Online behavior of users related to a product is captured. Online behavior may include any measurable or trackable event of a user on the Internet. This may include visits to web sites, frequency of pages visited, monitoring what is clicked at web sites, etc. Geo-location parameters for the users are also determined. A geo-location parameter is a geographic location for a user that has their online behavior captured. In one example, a geo-location parameter for a user is determined using a reverse Internet Protocol (IP) lookup. That includes determining the IP address of the user, and identifying a geographic location for the IP address, such as a zip code, city or some other location.

A user or a group of users may have multiple geo-location parameters. These multiple geo-location parameters are referred to as granularities. For example, a reverse IP address lookup may identify a smallest granularity geo-location parameter for the user, such as a zip code. Other higher granularities may be determined from the zip code. For example, a region may combine multiple neighboring zip codes. Another higher granularity may be a city or county having many regions. Yet another higher granularity may be a state, etc. Granularities smaller than a zip code may also be determined if location information is available for those granularities. For example, if GPS location information is available, granularities, such as groups of streets or a single street may be determined.

According to an embodiment, a smallest geo-location parameter having statistical significance for estimating the impact of online behavior on offline sales is determined. The smallest geo-location parameter is determined from the multiple granularities of geo-location parameters of the users. The smallest geo-location parameter is used to correlate online behavior with offline sales for the impact estimation. The determination of the smallest geo-location parameter is based on the statistical significance of the granularities of geo-location parameters. Statistical significance is associated with the statistical validity of data and may be dependent on determining the minimum sample or data points needed to avoid or minimize the probability of failing to detect real effects in the data. A statistically significant smallest geo-location parameter may be a granularity of the geo-location parameters for the users where there is sufficient online behavior data and offline data at that granularity to detect or estimate the impact of the online behavior on the offline sales.

For example, if online behavior is captured for a product for all the users in a particular zip code, however, there is minimal offline sales data for the same product in that zip code, then the impact of the online behavior on the offline sales for the zip code cannot reliably be determined. However, offline sales data may be available for a region encompassing multiple zip codes. This region may then become the smallest geo-location parameter for correlating online and offline data to estimate impact.

Other variables besides quantity of online and offline data are used to determine the smallest geo-location parameter. These variables may include the type of product or brand, purchase cycle of the product, IP penetration (e.g., level of granularity for a geo-location parameter that can be determined by reverse IP lookup), frequency of site visits, conversion rate of the behavioral outcome that is being tracked/captured within the online data, retail/store density, website traffic, and seasonality factors such as time of year, holidays, etc.

Also, the smallest geo-location parameter is dynamic. It may change over time as the variables change.

2. Method

FIG. 1 illustrates a method 100 for determining a smallest geo-location parameter, according to an embodiment. At step 101, online behavior is captured for a product. The product may be a single product or a group of products. For example, the product may be a facial cream or the product may be skin care products all sold under the same brand. The product may be consumer goods or services. One example of a service is a cellular phone service being offered for sale. The online behavior includes events monitored on the Internet, such as web site traffic at the product's web site, click-throughs for online advertisements or coupons, etc. The online behavior is stored, for example, in a database.

At step 102, offline data for the product is captured. This includes in-store sales of the product, use of coupons for the purchase of the products, or any events that are not online and related to sales of the product. The offline data may also be stored in a database.

At step 103, geo-location parameters for the online behavior are determined. This includes multiple granularities of geo-location parameters for users performing the events captured as the online behavior. The smallest granularity may include a set of blocks in a city or may be a zip code. Larger granularities may include a set of zip codes, a set of cities, or a state-level granularity. The smallest granularity may be dependent on the geo-location parameter data that is available for a user. For example, a reverse IP lookup is performed to determine the smallest granularity. The geo-location data available for a reverse IP lookup may vary by region. For more densely populated regions, such as a large city, the IP address of a user may be cross-referenced to a set of city blocks. For more sparsely populated areas, the user's IP address may be cross-referenced to a single zip code or to a larger region.

At step 104, the smallest granularity geo-location parameter is determined from the granularities of geo-location parameters determined at step 103.

At step 105, a determination is made as to whether the smallest granularity geo-location parameter determined at step 104 is statistically significant for estimating the impact of online behavior on offline sales for the product. A number of variables, including quantity of online behavior data and quantity of offline data for the smallest granularity geo-location parameter, which is determined from data captured at steps 101 and 102, and other variables, are used to evaluate statistical significance. As described above, examples of the other variables include the type of product or brand, purchase cycle of the product, IP penetration (e.g., level of granularity for a geo-location parameter that can be determined by reverse IP lookup), frequency of site visits, conversion rate of the behavioral outcome that is being tracked/captured within the online data, retail/store density, website traffic, and seasonality factors such as time of year, holidays.

If the smallest granularity geo-location parameter is determined not to be statistically significant at step 105, then the geo-location parameter is aggregated up at step 106, and step 105 is repeated. Aggregating up includes determining a next highest granularity geo-location parameter of the geo-location parameters determined at step 103. The different granularities may be predetermined, e.g., city block, zip code, region of zip codes, and state. Starting from the smallest granularity, the online behavior data can be aggregated to the next highest granularity, and so on. For example, all the online behavior data is stored for a particular group of city blocks. To determine the online behavior data for the next highest granularity, such as a zip code including multiple groups of city blocks, the online behavior data is aggregated for all the groups of city blocks in the zip code. This aggregation may include associating all the online behavior data for each user in the groups of city blocks to the zip code. The zip code can be used as an index to determine all the online behavior data for the product in the zip code. The online behavior data for the zip code may then be used to determine whether the zip code is statistically significant for estimating the impact of online behavior on offline sales for the product at step 105. This aggregation is repeated until a statistically significant geo-location parameter granularity is determined.

At step 107, after a statistically significant granularity of the geo-location parameters is determined, that granularity is used as the smallest granularity geo-location parameter for estimating the impact of online behavior on offline sales for the product.

At step 108, MROI econometric modeling may be used to estimate the impact of online behavior on offline sales for the product. The inputs to the modeling include the online behavior data and the offline data for the smallest geo-location parameter data. Other inputs for the modeling may include information on marketing campaigns, competitor behavior for the region, demographics, etc. The MROI model may include historical data for marketing on the resulting impact of the marketing.

The method 100 may be used optimize online marketing for a particular region. For example, if a determination is made that online behavior is impacting offline sales for a particular zip code, then a web site may be optimized to better serve the needs for that zip code. This may entail providing different web sites for different zip codes. For example, a web site for one zip code may be designed for marketing a brand of luxury cars, because it was determined that online behavior for that zip code is impacting sales of luxury cars at local dealerships. A web site for another zip code may be designed to promote hybrid vehicles, because the online and offline sales data indicates that consumers are interested in "green" products. Targeted, region-by-region, online, marketing campaigns may be generated in response to the MROI modeling, and as a result improve product sales.

The method 100 is not just performed for a snapshot of online and offline data. Instead, the online and offline data are continuously or periodically captured and used to determine the smallest geo-location parameter continuously or periodically. As a result, the smallest geo-location parameter for a product may change over time due to varying online and offline data. Furthermore, the changing smallest geo-location parameter leads to continuous or periodic estimation of the impact of online behavior on offline sales for the product. As a result, marketing campaigns or other business practices may be periodically optimized based on the variances of online and offline user behavior.

3. System

Figure 2:
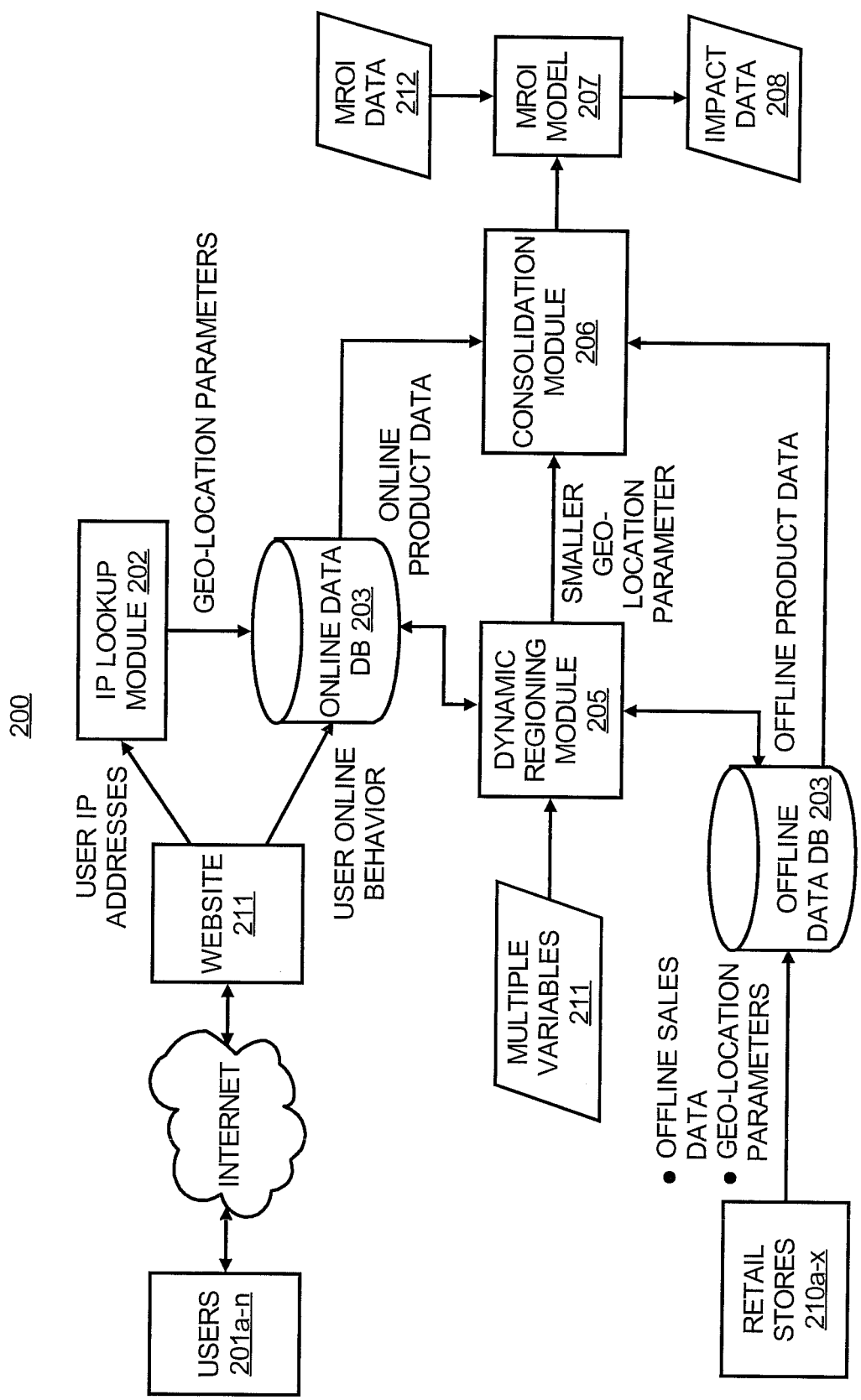
FIG. 2 illustrates a system for determining a smallest geo-location parameter and estimating impact of online behavior on offline sales, according to an embodiment.

FIG. 2 illustrates a system 200, according to an embodiment. Multiple users 201a-n access a web site 211 via the Internet. For each captured online behavior of a user, an IP address is obtained from their web site requests. A reverse IP look module 202 determines a geo-location parameter for each user. This may be performed with a lookup table correlating IP addresses with zip codes or regions. Note that a module as used herein may include software executed by a processor or other processing circuitry. Instead of reverse IP lookup, GPS or other systems and techniques may be used to determine a geo-location parameter of a user. The reverse IP lookup, GPS or other geo-location capture system is used to determine a smallest granularity for each captured online behavior of a user. This information may be aggregated to determine the captured online behavior of users for higher granularities.

The geo-location parameter for each user is stored in an online data database (DB) 203. The online data DB 203 stores the online behavior captured for each user along with the corresponding geo-location parameter. The online behavior data with the corresponding geo-location parameters are used as an input to a dynamic regioning module 205. Examples of fields in DB 203 may include product, geo-location parameter granularity, captured online behavior, and user information if available.

In addition to online behavior data, the system 200 captures offline data. Retail stores 210a-g capture offline sales data and corresponding geo-location parameters for the offline sales, such as store locations where sales are made. An offline data DB 204 stores the offline sales data and the corresponding geo-location parameters. Examples of fields in DB 204 may include product, geo-location parameter granularity, offline data, and user information if available.

The online and offline data may be captured and stored for many products continuously or periodically. If the impact of online behavior on offline sales needs to be determined for a particular product, the online and offline data for the product is sent to the dynamic regioning module 205. For example, the dynamic regioning module 205 retrieves the online and offline product data from the DBs 203 and 204. Then, using that data and other variables 211, the dynamic regioning module 205 determines the smallest geo-location parameter that is statistically significant for estimating the impact of online behavior on offline sales for the product. The dynamic regioning module 205 may use the method 100 to determine the smallest geo-location parameter that is statistically significant. The variables 211 for this determination may include amount of online and offline data at a particular granularity, the type of product or brand, purchase cycle of the product, IP penetration (e.g., level of granularity for a geo-location parameter that can be determined by reverse IP lookup, frequency of site visits, conversion rate of the behavioral outcome that is being tracked/captured within the online data, retail/store density, website traffic, and seasonality factors such as time of year, holidays, etc.

One example of how the variables 211 are used to calculate statistical significance includes one or more thresholds. For example, a threshold is set as to the amount of online and offline data that is needed to estimate impact of online behavior on offline sales. This threshold may be product dependent. Once a granularity is identified where sufficient online and offline data is available to satisfy the threshold, then other variables may be used to determine whether the granularity is statistically significant. In another example, the variables are used to adjust the threshold. For example, for a product determined to have increased sales at a particular time of year (i.e., seasonal factor) based on historical sales figures, more offline sales data may be needed at that time of year for a particular granularity to be identified as statistically significant. Other evaluations may involve determining a score for each variable and selecting a granularity based on the scores.

A consolidation module 206 consolidates all the online and offline product data for the smallest geo-location parameter. The online and offline product data, for example, is retrieved from the DBs 203 and 204. This may include using the product and the smallest geo-location parameter to retrieve all corresponding online and offline data for the smallest geo-location parameter. If the online and offline data is stored in the DBs 203 and 204 in a smaller granularity (e.g., by zip code) and the smallest geo-location parameter is a larger granularity (e.g., by state), then the consolidation module 206 retrieves all the online and offline product data for each zip code in a state and consolidates it.

An MROI model 207 uses the consolidated data and MROI data 212, such as information on marketing campaigns, competitor behavior for the region, demographics, etc. The MROI model 207 generates impact data 208, which includes an estimation of how online behavior impacts offline sales for the product. The system 200 may be used to determine impact data 208 periodically or continuously.

The MROI model 207 is an econometric model that isolates the effects of online behavior on offline sales for the smallest geo-location parameter. The MROI model 207 may include years of sales and marketing data to increase accuracy and to accommodate variables such as seasonality, etc. From the historical sales and marketing data, marketing response curves are created by calculating the relationship between marketing and sales at different levels of investment in order to find the average and marginal ROI. A financial model converts these response curves into net revenues. By redistributing money from one driver to another we can create a more optimal mix of marketing expenditure.

Figure 3:
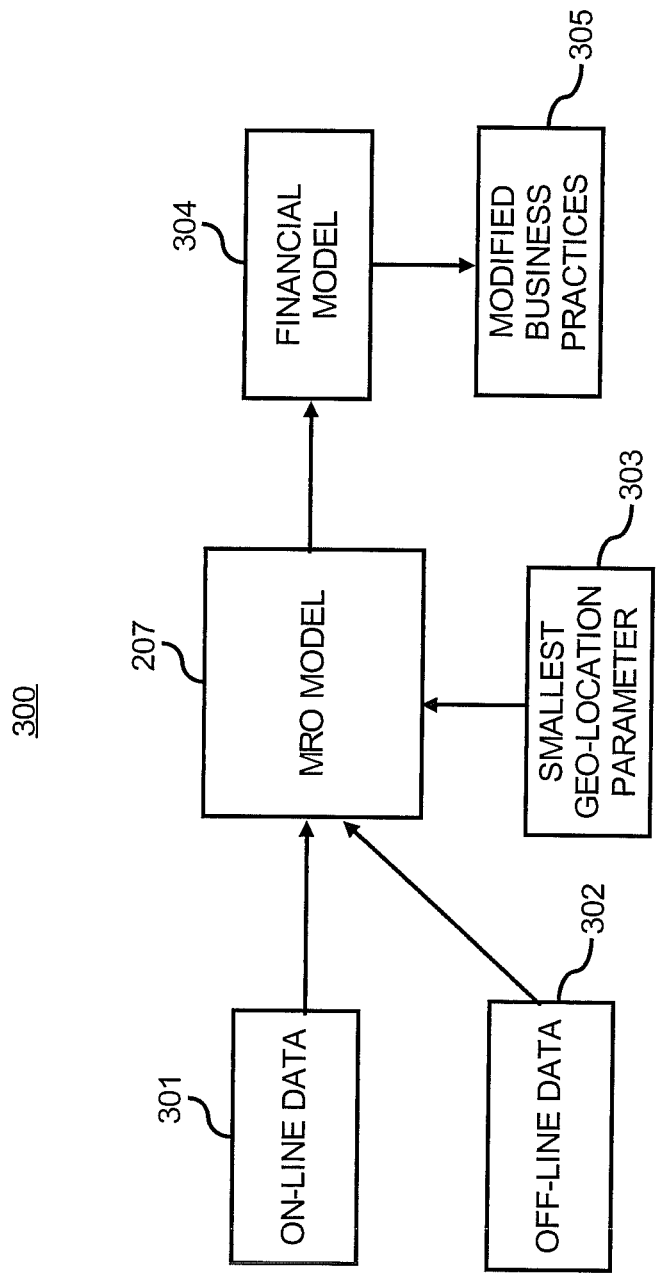
FIG. 3 illustrates using marketing return on investment (MROI) modeling to modify business practices based on an estimation of impact of online behavior on offline sales, according to an embodiment.
Figure 4:
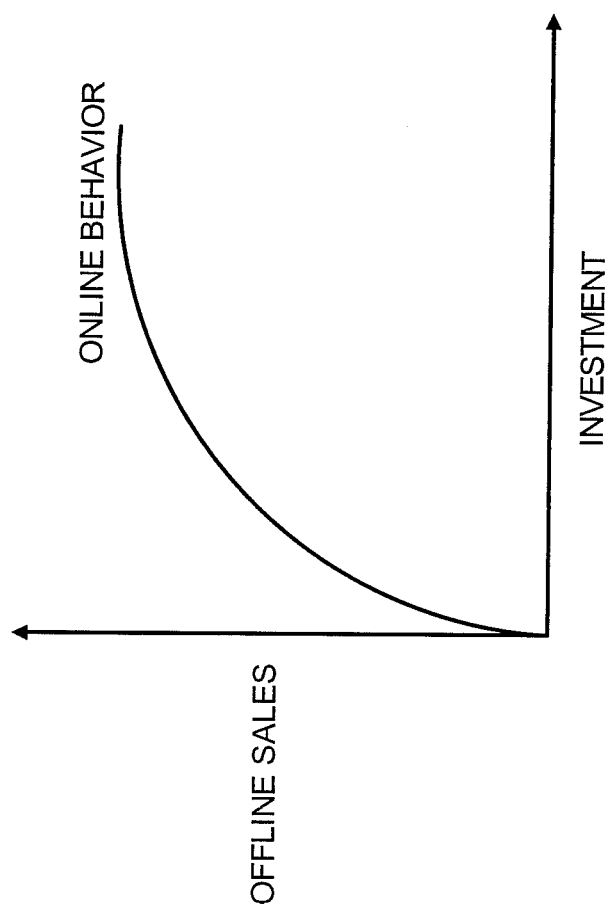
FIG. 4 illustrates a response curve generated by MROI modeling, according to an embodiment.

FIG. 3 illustrates online data 301 and offline data 302 (e.g., the data from the consolidation module 206 shown in FIG. 2) provided to the MROI model 207. The smallest geo-location parameter 303, which is data determined by the dynamic regioning module 206 shown in FIG. 2, is also provided to the MROI model 207. In one example, based on the historical sales data in the MROI model 207, a response curve is generated for the smallest geo-location parameter that represents the online behavior for the product as a function of investment and offline sales. FIG. 4 shows an example of a response curve with investment, such as dollars spent on marketing online, on the x-axis and offline sales on the y-axis. The curve shows an increase in online behavior, such as website traffic, correlated with an increase in offline sales and investment. The MROI model 207 may generate response curves for other marketing, such as TV/radio marketing, etc.

A financial model 304 shown in FIG. 4, converts the response curves into net revenues based on historical data. Then, business practices may be modified, shown as 305, based on the output of the models. Also, the modifications may be customized to specific regions based on the smallest geo-location parameter. This may include increasing or decreasing investment in different types of marketing in different regions. Also, web sites may be modified by region to accommodate different impacts on offline sales for different regions.

4. Computer Readable Medium

Figure 5:
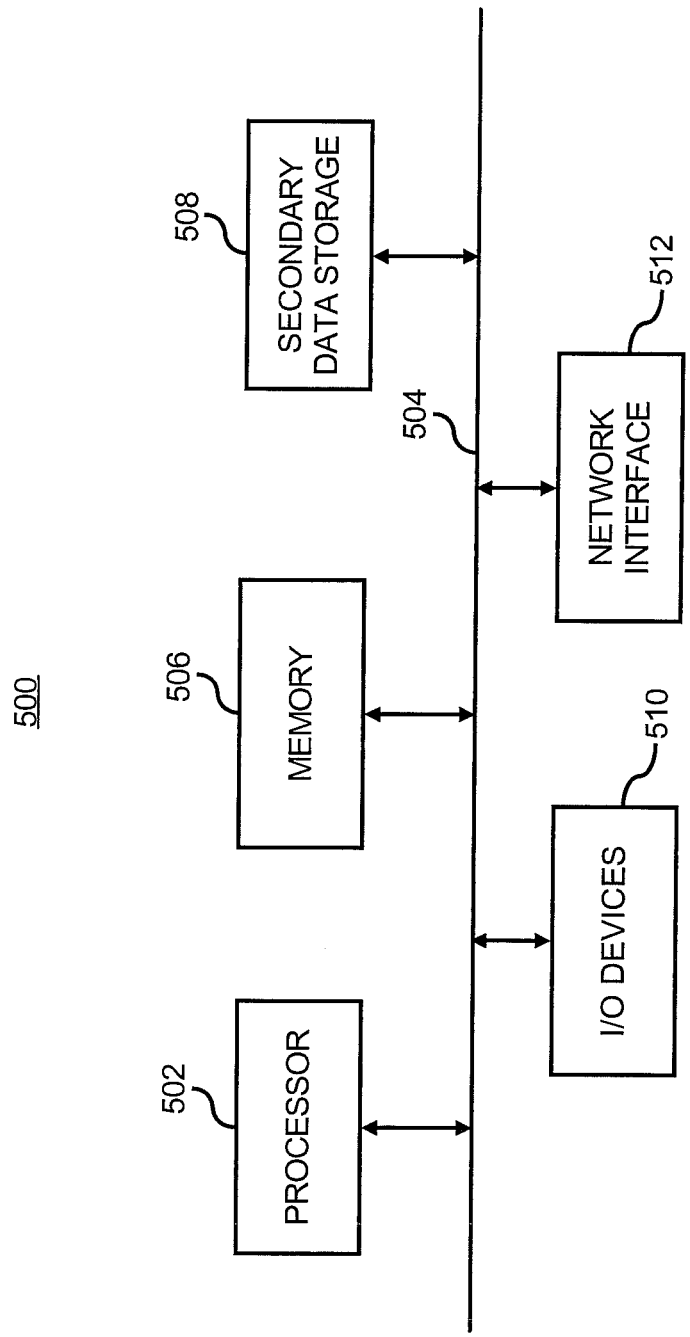
FIG. 5 illustrates a computer system that may be used for the method and system, according to an embodiment.

FIG. 5 shows a computer system 500 that may be used with the embodiments described herein. The computer system 500 represents a generic platform that includes components that may be in a server or other computer system. The computer system 500 may be used as a platform for executing one or more of the methods, functions and other steps described herein. These steps may be embodied as software stored on one or more computer readable mediums.

The computer system 500 includes a processor 502 that may implement or execute software instructions performing some or all of the methods, functions and other steps described herein. Commands and data from the processor 502 are communicated over a communication bus 504. The computer system 500 also includes a main memory 506, such as a random access memory (RAM), where the software and data for processor 502 may reside during runtime, and a secondary data storage 508, which may be non-volatile and stores software and data. The memory and data storage are examples of computer readable mediums.

The computer system 500 may include one or more I/O devices 510, such as a keyboard, a mouse, a display, etc. The computer system 500 may include a network interface 512 for connecting to a network. It will be apparent to one of ordinary skill in the art that other known electronic components may be added or substituted in the computer system 500.

One or more of the steps of the methods described herein and other steps described herein and one or more of the components of the systems described herein may be implemented as computer code stored on a computer readable medium, such as the memory and/or secondary storage, and executed on a computer system, for example, by a processor, application-specific integrated circuit (ASIC), or other controller. The code may exist as software program(s) comprised of program instructions in source code, object code, executable code or other formats. Examples of computer readable medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments.

What is claimed is:

1. A computer system to correlate online behavior with offline sales for a product, the system comprising:
   data storage to store online behavior data and offline sales data for the product;
   a dynamic regioning module implemented by a processor to:
      determine online behavior of users, wherein the online behavior is related to the product,
      determine granularities of the geo-location parameter for the on-line behavior of users,
      determine a smallest granularity of the granularities of the geo-location parameter,
      determine whether the smallest granularity is statistically significant for estimating an impact of the online behavior on offline sales of the product based on the online behavior data and the offline sales data and one or more parameters associated with the online behavior and offline sales,
      in response to a determination that the smallest granularity is statistically significant, use the smallest granularity as the smallest geo-location parameter, and
      in response to a determination that the smallest granularity is not statistically significant, repeatedly determine whether a next higher granularity of the granularities is statistically significant until a granularity of statistical significance is determined and select the statistically significant granularity as the smallest geo-location parameter; and
   a consolidation module, implemented by the processor, to consolidate the stored online behavior data and offline sales data based on the smallest geo-location parameter.

2. The computer system of claim 1, further comprising:
   a marketing return on investment (MROI) model, wherein the consolidated data is input into the MROI model to determine the impact of the online behavior on the offline sales of the product for the smallest geo-location parameter.

3. The computer system of claim 2, wherein the dynamic regioning module is to determine whether the smallest granularity is statistically significant from a minimum number of data points for the online behavior data and the offline sales data that are needed to avoid or minimize a probability of failing to detect real effects of the online behavior on the offline sales for the smallest granularity.

4. The computer system of claim 3, wherein one of the granularities is selected as the smallest geo-location parameter of statistical significance based on one or more of amount of online behavior data and offline sales data for each granularity, type of product, type of brand, purchase cycle of the product, and seasonality factors.

5. A method to correlate online behavior with offline sales, the method comprising:
   receiving, by a network interface, online behavior data captured from web sites and receiving offline sales data for a product captured from store sales;
   storing, by a data storage, the received online behavior data and offline sales data;
      determining, by a processor, granularities of a geo-location parameter for on-line behavior of users;
      determining a smallest granularity of the granularities of the geo-location parameter;
      determining whether the smallest granularity is statistically significant for estimating an impact of the online behavior on offline sales of the product based on the online behavior data and the offline sales data and one or more parameters associated with the online behavior and offline sales;
      in response to determining the smallest granularity is statistically significant, using the smallest granularity as a smallest geo-location parameter;
      in response to determining the smallest granularity is not statistically significant, repeatedly determine whether a next higher granularity of the granularities is statistically significant until a granularity of statistical significance is determined and select the statistically significant granularity as the smallest geo-location parameter; and
   use the smallest geo-location parameter to consolidate data for the online behavior data and data for offline sales.

6. The method of claim 5, further comprising determining whether the smallest granularity is statistically significant from a minimum number of data points for the online behavior data and the offline sales data that are needed to avoid or minimize a probability of failing to detect real effects of the online behavior on the offline sales for the smallest granularity.

7. The method of claim 5, further comprising consolidating the stored online behavior data and offline sales data based on the smallest geo-location parameter.

8. At least one computer readable medium storing computer code that when executed on one or more computer systems is to:
   determine online behavior of users, wherein the online behavior is related to a product;
   determine granularities of a geo-location parameter for the on-line behavior of users;
   determine a smallest granularity of the granularities of the geo-location parameter;
   determine whether the smallest granularity is statistically significant for estimating an impact of the online behavior on offline sales of the product based on one or more parameters associated with the online behavior and offline sales;

in response to determining the smallest granularity is statistically significant, use the smallest granularity as a smallest geo-location parameter;

in response to determining the smallest granularity is not statistically significant, repeatedly determine whether a next higher granularity of the granularities is statistically significant until a granularity of statistically significance is determined, and select the statistically significant granularity as the smallest geo-location parameter; and use the smallest geo-location parameter to consolidate data for the online behavior data and data for offline sales.

9. The at least one computer readable medium of claim 8, wherein the smallest granularity is determined to be statistically significant from a minimum number of data points for the online behavior data and the offline sales data that are needed to avoid or minimize a probability of failing to detect real effects of the online behavior on the offline sales for the smallest granularity.

10. The at least one computer readable medium of claim 8, wherein to determine whether the smallest granularity is statistically significant, the code is to:

identify one or more variables operable to be used to characterize a statistical significance of the geo-location parameters for the online behavior of users; and use the one or more variables to determine whether the smallest geo-location parameter is statistically significant.

11. The at least one computer readable medium of claim 10, wherein the one or more variables include an amount of online behavior data and offline sales data for each granularity, type of product, type of brand, purchase cycle of the product, and seasonality factors.

12. The at least one computer readable medium of claim 10, wherein the smallest geo-location parameter is determined over time as online and offline product data and one or more of the variables vary over time.

13. The at least one computer readable medium of claim 8, wherein the code is to:

input online behavior of users related to the product and for the smallest geo-location parameter into a marketing return on investment (MROI) model;

input offline sales data of the product for the smallest geo-location parameter into the MROI model; and estimate the impact of the online behavior on the offline sales of the product for the smallest geo-location parameter.

14. The at least one computer readable medium of claim 13, wherein the code is to:

modify a business practice related to the product in response to the estimated impact.

15. The at least one computer readable medium of claim 13, wherein the code is to:

modify a web site for the product and associated with the smallest geo-location parameter in response to the estimated impact.

16. The at least one computer readable medium of claim 8, wherein the code is to:

perform a reverse Internet Protocol lookup for events captured for the online behavior to determine the geo-location parameters.

17. The at least one computer readable medium of claim 8, wherein the user geo-location parameters for the users comprises a geographic location for each of the users.

18. The at least one computer readable medium of claim 17, wherein the geo-location parameters comprise one or more of GPS coordinates, a group of city blocks, a zip code, and a region encompassing multiple neighboring zip codes.

* * * * *